(12) United States Patent
Noguchi et al.

(10) Patent No.: US 11,927,561 B2
(45) Date of Patent: Mar. 12, 2024

(54) SOLID ELECTROLYTE FOR GAS SENSOR AND GAS SENSOR

(71) Applicant: DENSO CORPORATION, Kariya (JP)

(72) Inventors: Makoto Noguchi, Kariya (JP); Satoshi Suzuki, Kariya (JP); Mitsuhiro Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 959 days.

(21) Appl. No.: 16/864,281

(22) Filed: May 1, 2020

(65) Prior Publication Data

US 2020/0256823 A1    Aug. 13, 2020

Related U.S. Application Data

(63) Continuation of application No. PCT/JP2018/038083, filed on Oct. 12, 2018.

(30) Foreign Application Priority Data

Nov. 3, 2017   (JP) ................ 2017-213348

(51) Int. Cl.
*G01N 27/407*   (2006.01)
*C04B 35/486*   (2006.01)

(52) U.S. Cl.
CPC ....... *G01N 27/4073* (2013.01); *C04B 35/486* (2013.01); *C04B 2235/3246* (2013.01); *C04B 2235/5436* (2013.01); *C04B 2235/5445* (2013.01); *C04B 2235/5454* (2013.01); *C04B 2235/781* (2013.01); *C04B 2235/785* (2013.01); *C04B 2235/786* (2013.01)

(58) Field of Classification Search
CPC .............. G01N 27/4073; C04B 35/486; C04B 2235/3246; C04B 2235/781; C04B 2235/785; C04B 2235/786
See application file for complete search history.

(56) References Cited

FOREIGN PATENT DOCUMENTS

| EP | 0 942 279 | 9/1999 | |
|---|---|---|---|
| EP | 0942279 A2 * | 9/1999 | ........... G01N 27/407 |
| JP | H04-130018 | 5/1992 | |
| JP | H11-116328 | 4/1999 | |

OTHER PUBLICATIONS

Cambridge online defintion of the word "rate", doenloaded Jul. 12, 2023 from https://dictionary.cambridge.org/us/dictionary/english/rate (Year: 2023).*

* cited by examiner

*Primary Examiner* — Alexander S Noguerola
(74) *Attorney, Agent, or Firm* — Nixon & Vanderhye P.C.

(57) ABSTRACT

The invention relates to a solid electrolyte comprised of partially stabilized zirconia, and a gas sensor including the solid electrolyte. The partially stabilized zirconia includes crystal particles, the crystal particles include at least stabilizer low-concentration phase particles, and the partially stabilized zirconia further includes voids. Among the stabilizer low-concentration phase particles, the presence rate of the stabilizer low-concentration phase particles where each distance from a void is 5 μm or less is 65 volume percent or more. The stabilizer low-concentration phase particles include specific stabilizer low-concentration phase particles each having a distance of 5 μm or less from an adjacent void in the voids, a presence rate of the specific stabilizer low-concentration phase particles having 65 volume percent or more.

6 Claims, 8 Drawing Sheets

SOLID ELECTROLYTE FOR GAS SENSOR AND GAS SENSOR

CROSS-REFERENCE TO RELATED APPLICATION

The present application is a continuation application of International Application No. PCT/JP2018/038083, filed on Oct. 12, 2018, which claims priority to Japanese Patent Application No. 2017-213348, filed on Nov. 3, 2017. The contents of these applications are incorporated herein by reference in their entirety.

BACKGROUND

Technical Field

The present disclosure relates to a solid electrolyte comprised of partially stabilized zirconia, and a gas sensor including the solid electrolyte.

Background Art

A gas sensor element is used in an exhaust system of an internal combustion engine and the like for the purpose of detecting oxygen concentration and/or air-fuel ratio in an exhaust gas and the like. In such a gas sensor element, an oxide ion conductive solid electrolyte such as zirconia is used.

The partially stabilized zirconia is required to suppress deterioration of strength in a high temperature environment, but it is also important to suppress deterioration of strength at a low temperature. In other words, the partially stabilized zirconia exhibits a phase transition from tetragonal (i.e., a T phase) to monocline (i.e., an M phase) in a crystal phase constituting a crystal particle at a low temperature of 100 to 300° C. in the presence of moisture. This phase transition causes volume change such as volume expansion, which leads to deterioration of strength of the solid electrolyte.

SUMMARY

In the present disclosure, provided is a solid electrolyte for a gas sensor as the following. The solid electrolyte includes a partially stabilized zirconia, the partially stabilized zirconia comprises crystal particles, the crystal particles include stabilizer low-concentration phase particles each being definded such that a concentration of the stabilizer is less than 4.7 mol %, the partially stabilized zirconia comprises voids between the crystal particles, and the stabilizer low-concentration phase particles in the partially stabilized zirconia include specific stabilizer low-concentration phase particles each having a distance of 5 μm or less from at least one adjacent void in the voids, a presence rate of the specific stabilizer low-concentration phase particles having 65 volume percent or more.

BRIEF DESCRIPTION OF THE DRAWINGS

The above object and other objects, features and advantages of the present disclosure shall become more evident by the following detailed description with reference to the accompanying drawings. In the drawings.

DETAILED DESCRIPTION OF THE PREFERRED EMBODIMENTS

Therefore, for example, PTL 1 discloses a sintered body further containing alumina and titania in a zirconia sintered body in which yttria is in the state of solid solution. Further, it is disclosed that phase transition is suppressed in such zirconia sintered body.

[PTL 1] JPH11-116328 A

In recent years, strict fuel consumption and emission control are required for vehicles, and, for example, on-board gas sensors are sought to be more reliable in an even higher temperature environment by changing the mounting position thereof and the like. On the other hand, as a measure against frequent engine stops due to popularization of hybrid vehicles, idle stop vehicles and the like, maintenance of low temperature by ON/OFF switching of a heater in a gas sensor when a vehicle comes to a halt is being sought from the perspective of reducing power consumption. Therefore, a solid electrolyte is also required to have high reliability under increased load imposed by cooling and heating cycles, and it is desired to suppress deterioration of strength not only under a high temperature environment but also under low temperature in the presence of moisture.

However, there is a limit to suppressing the phase transition itself, and it is difficult to completely prevent the phase transition. Therefore, in a solid electrolyte made of a conventional zirconia sintered body or the like, phase transitions occur to no small extent in a low temperature region of the cooling and heating cycles in the presence of moisture, and volume change of the crystal phase occurs. Thereby, internal stress such as tensile stress is generated at the crystal grain boundary, and cracking may develop from, for example, a moisture contacting surface of the solid electrolyte. As a result, strength deteriorates, which may lead to destruction of the solid electrolyte.

An object of the present disclosure is to provide a solid electrolyte capable of exhibiting excellent strength even when exposed to a low temperature environment in the presence of moisture, and a gas sensor using the solid electrolyte.

One embodiment of the present disclosure is a solid electrolyte for a gas sensor, the solid electrolyte comprising a partially stabilized zirconia that is comprised of zirconia and a stabilizer being in a solid solution in the zirconia; wherein:

the partially stabilized zirconia comprises crystal particles, the crystal particles include stabilizer low-concentration phase particles each being definded such that a concentration of the stabilizer is less than 4.7 mol %, the partially stabilized zirconia comprises voids between the crystal particles, and the stabilizer low-concentration phase particles in the partially stabilized zirconia include specific stabilizer low-concentration phase particles each having a distance of 5 μm or less from at least one adjacent void in the voids, a presence rate of the specific stabilizer low-concentration phase particles having 65 volume percent (i.e. 65% by volume) or more.

Another embodiment of the present disclosure is a gas sensor including the solid electrolyte.

As described above, the solid electrolyte has stabilizer low-concentration phase particles as crystal particles. The stabilizer low-concentration phase particles are referred to as "low-concentration phase particles" when appropriate. Furthermore, the partially stabilized zirconia has voids, and low-concentration phase particles where distances from at least one adjacent void in the voids are within the above range are present at the predetermined ratio or higher. That is, there are many low-concentration phase particles that are close to the voids.

Therefore, even if the solid electrolyte is exposed to a low-temperature environment of, for example, 100 to 300° C. in the presence of moisture, and volume change associated with phase transition occurs in the low-concentration phase particles, voids present close to the low-concentration phase particles can mitigate the internal stress generated at the grain boundaries of the crystal particles. This is considered to be for the reason that the voids can absorb the amount of volume change such as the amount of volume expansion of the low-concentration phase particles. As a result, the solid electrolyte can exhibit excellent strength even when exposed to a low temperature environment in the presence of moisture.

The gas sensor includes a solid electrolyte exhibiting excellent strength even under a low temperature environment in the presence of moisture as described above. Therefore, even if the gas sensor is exposed to a low temperature environment containing moisture, internal damage is unlikely to occur. Therefore, the gas sensor shows high reliability under increased load imposed by cooling and heating cycles.

As described above, according to the above embodiment, it is possible to provide a solid electrolyte that can exhibit excellent strength even when exposed to a low temperature environment in the presence of moisture, and a gas sensor using the solid electrolyte.

Further, signs in parentheses described in the claims show correspondence relations with the specific means as described in embodiments to be described later, and do not limit the technical scope of the present disclosure.

First Embodiment

Figure 1:
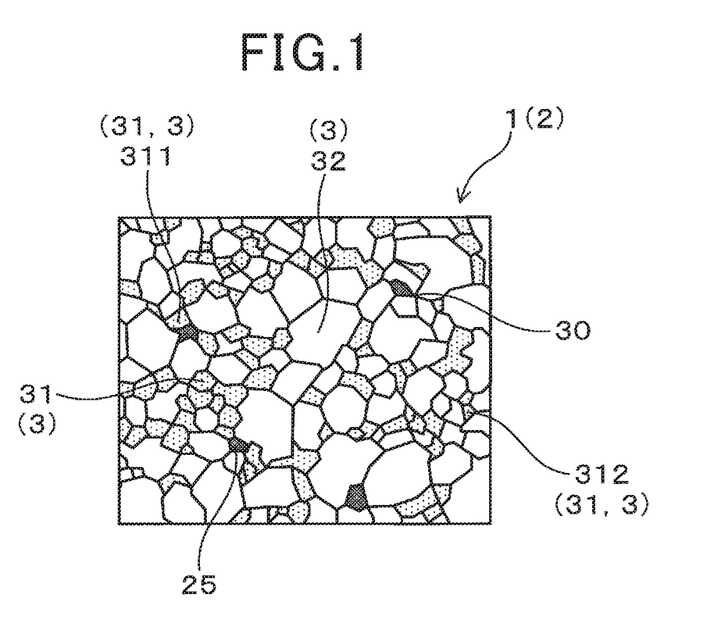
FIG. 1 is a schematic view showing a microstructure of partially stabilized zirconia constituting a solid electrolyte in a first embodiment.

An embodiment relating to a solid electrolyte shall be described with reference to FIG. 1 to FIG. 4. As illustrated in FIG. 1, a solid electrolyte 1 is comprised of partially stabilized zirconia 2. The partially stabilized zirconia 2 is a so-called sintered compact. The partially stabilized zirconia 2 is a sintered compact in which a stabilizer is in a solid solution in the zirconia, and is comprised of many crystal particles 3.

Examples of the stabilizer include yttria, calcia, magnesia, scandia, ytterbia and the like. The partially stabilized zirconia can contain at least one of these as a stabilizer.

As illustrated in FIG. 1, the partially stabilized zirconia 2 includes crystal particles 3. The crystal particles 3 include a large number of low-concentration phase particles 31. The low-concentration phase particles 31 are crystal particles being definded such that a concentration of a stabilizer is less than 4.7 mol %. The crystal system of the crystal phase in the low-concentration phase particles 31 is usually monoclinic or tetragonal. By scanning electron microscope/energy dispersive X-ray spectroscopy (that is, SEM/EDX analysis) to be described later, to measure the concentration of a metal element such as Y in the stabilizer, and to thereby perform measurement of the concentration of the stabilizer in the crystal particles 3.

On the other hand, the crystal particles 3 includes a large number of stabilizer high-concentration phase particles 32. The stabilizer high-concentration phase particles 32 are referred to as the "high-concentration phase particles 32" when appropriate. The high-concentration phase particles 32 are crystal particles being definded such that a concentration of a stabilizer is 4.7 mol % or higher. The crystal system of the crystal phase in the high-concentration phase particles 32 is usually cubic.

The main crystal grains constituting the partially stabilized zirconia 2 are preferably high-concentration phase particles 32. In this case, stability of the solid electrolyte 1 to heat increases. The main crystal grains are crystal particles having the highest content on a volume basis among the crystal particles 3 constituting the partially stabilized zirconia 2.

The partially stabilized zirconia 2 has voids 25 between the crystal particles 3, and has low-concentration phase particles 31 in which each distance D1 from an adjacent void 25 is 5 μm or less. Among the many low-concentration phase particles 31 constituting the partially stabilized zirconia 2, the low-concentration phase particles 31 having an distance D1 from an adjacent void 25 of 5 μm or less are referred to as "neighboring low-concentration phase particles 311" when appropriate. On the other hand, the low-concentration phase particles 31 having an distance D1 from an adjacent void 25 exceeding 5 μm are referred to as "remote low-concentration phase particles 312" when appropriate.

Figure 2A:
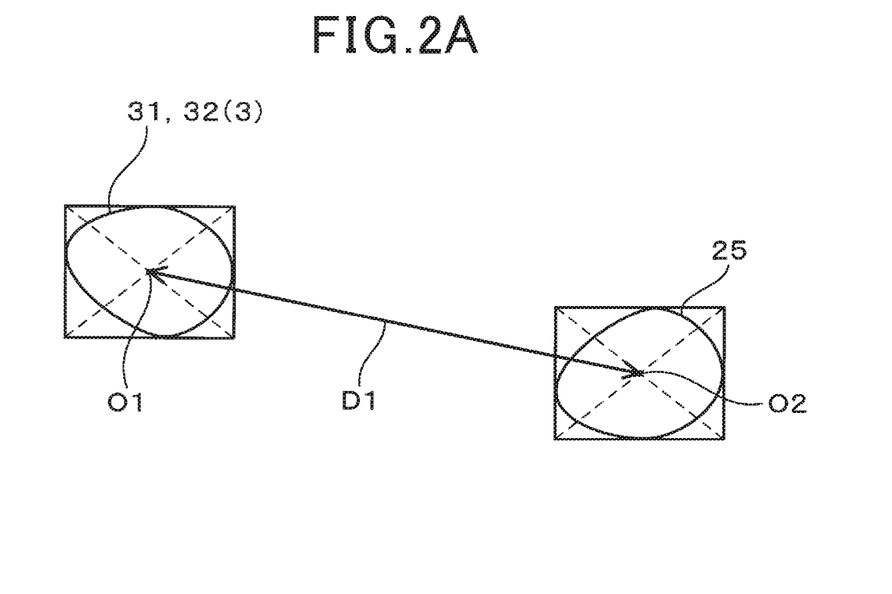
FIG. 2A is an explanatory view showing an distance between a crystal particle and a void.

As illustrated in FIG. 2A, the distance D1 between a low-concentration phase particle 31 and a void 25 refers to the distance between the centers of the two. The center O1 of a crystal particle 3 such as the low-concentration phase particle 31 is the center of gravity of a rectangle surrounded by the maximum widths of the crystal particle 3 in the horizontal direction and the vertical direction. The same holds true for the center O2 of a void 25, and the center O2 is the center of gravity of a rectangle surrounded by the maximum widths of the void 25 in the horizontal direction and the vertical direction. The low-concentration phase particles 31 having an distance D1 from an adjacent void 25 of 5 μm or less are the neighboring low-concentration phase particles 311 mentioned above. On the other hand, the low-concentration phase particles 31 having an distance D1 from an adjacent void 25 exceeding 5 μm are the remote low-concentration phase particles 312 mentioned above. The neighboring low-concentration phase particles 311 may or may not be adjacent to the voids 25. The voids 25 can sufficiently mitigate a volume change such as a volume expansion associated with phase transition of the neighboring low-concentration phase particles 311 present in the vicinity.

The presence rate of the neighboring low-concentration phase particles 311 among the low-concentration phase particles 31 in the partially stabilized zirconia 2 is 65 volume percent (i.e. 65% by volume) or more on a volume basis. When the presence rate of the neighboring low-concentration phase particles 311 is less than 65 volume percent, it means that there are many low-concentration phase particles 31 that are not present in the vicinity of the voids 25. As such, the effect of mitigating the volume change of the low-concentration phase particles 31 caused by the voids 25 cannot be sufficiently obtained. As such, for example, when phase transition occurs in the low-concentration phase particles 31 at a low temperature in the presence of moisture, the volume change cannot be sufficiently mitigated and the strength may deteriorate. From the perspective of more sufficiently obtaining the mitigating effect and further suppressing the strength deterioration, it is preferable that the presence rate of the neighboring low-concentration phase particles 311 be 80 volume percent or more. Thereby, it is possible to sufficiently reduce the remote low-concentration phase particles 312, with which it is difficult to mitigate the volume change by the voids 25.

Figure 3:
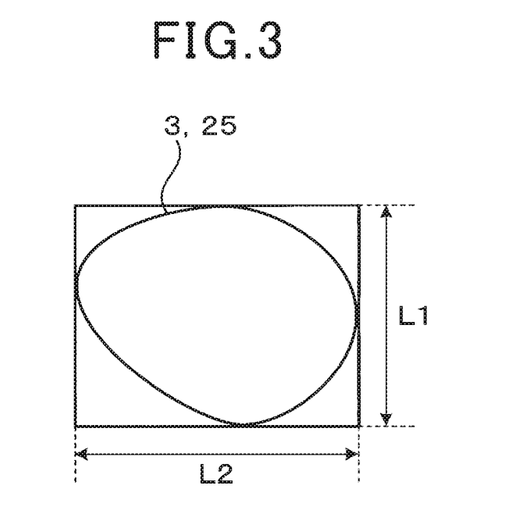
FIG. 3 is an explanatory view showing particle size of a crystal particle or a void in the first embodiment.

As illustrated in FIG. 3, the particle size of a low-concentration phase particle 31 is expressed by an arithmetic mean of length L1 in the horizontal direction and length L2 in the vertical direction of a rectangle surrounded by the maximum widths of a mixed phase particle 35 in the horizontal direction and the vertical direction. Meanwhile, the particle size of other crystal particles 3 and voids 25 are also measured and calculated in the same manner as that of the low-concentration phase particles 31.

Figure 4:
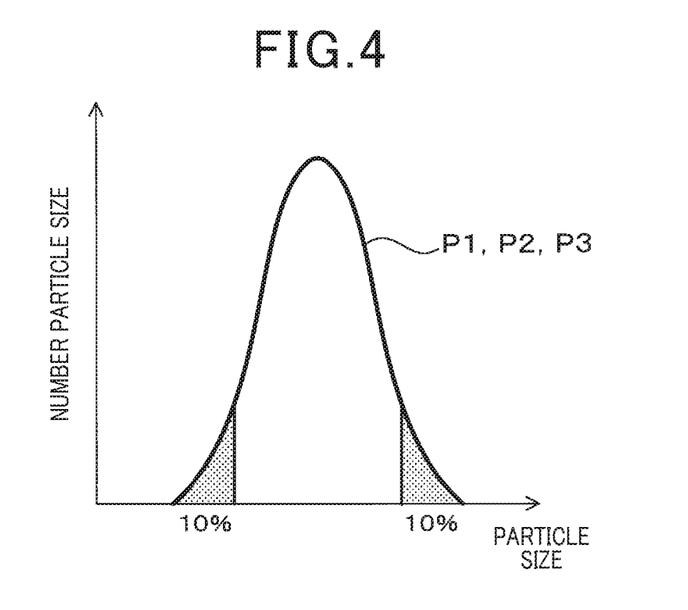
FIG. 4 is an explanatory view showing a number particle size distribution of crystal particles or voids in the first embodiment.

The number particle size distribution P1 of the low-concentration phase particles 31 is illustrated in FIG. 4. Small-diameter side particles are correspond to the 10% smallest particle sizes in a number particle size distribution of the stabilizer low-concentration phase particles; and large-diameter size particles are correspond to the 10% largest particle sizes in the number particle size distribution of the stabilizer low-concentration phase particles. As illustrated in FIG. 4, in the number particle size distribution P1, the average particle size of the low-concentration phase particles 31 calculated for the remaining 80% of particle sizes, exclusive of the small-diameter side particles and large-diameter size particles, is the average particle size of the low-concentration phase particles 31. In FIG. 4, a region denoting the small-diameter side particles and a region denoting the large-diameter size particles are shown dotted. That is, the average particle size is calculated by excluding the small-diameter side particles and large-diameter size particles, adding particle sizes of the remaining low-concentration phase particles 31, and dividing the sum by the number of particles. The number particle size distribution of the low-concentration phase particles 31 is created based on 50 low-concentration phase particles 31. Further, the average size of the voids 25 and the average particle size of the high-concentration phase particles 32 are also calculated in the same manner as that of the low-concentration phase particles 31, except that the calculations are based on the number particle size distribution P2 of 50 voids 25 and the number particle size distribution P3 of 50 high-concentration phase particles 32, respectively.

The average particle size of the low-concentration phase particles 31 is preferably from 0.05 to 1.0 µm, and the average size of the voids 25 is preferably from 0.05 to 5.0 µm. When both the average particle size of the low-concentration phase particles 31 and the average size of the voids 25 are respectively within the ranges mentioned above, the voids 25 can more sufficiently absorb the volume expansion of the low-concentration phase particles 31. That is, the voids 25 can sufficiently mitigate the volume change of the low-concentration phase particles 31, and the stress mitigating effect is enhanced. Thereby, stress such as tensile stress generated at the grain boundaries 30 of the crystal particles 3 is more sufficiently reduced. Therefore, it is possible to further suppress strength deterioration caused by the developing of cracking. From the perspective of further enhancing this effect, the average size of the voids 25 is more preferably from 0.05 to 2.0 µm.

Figure 2B:
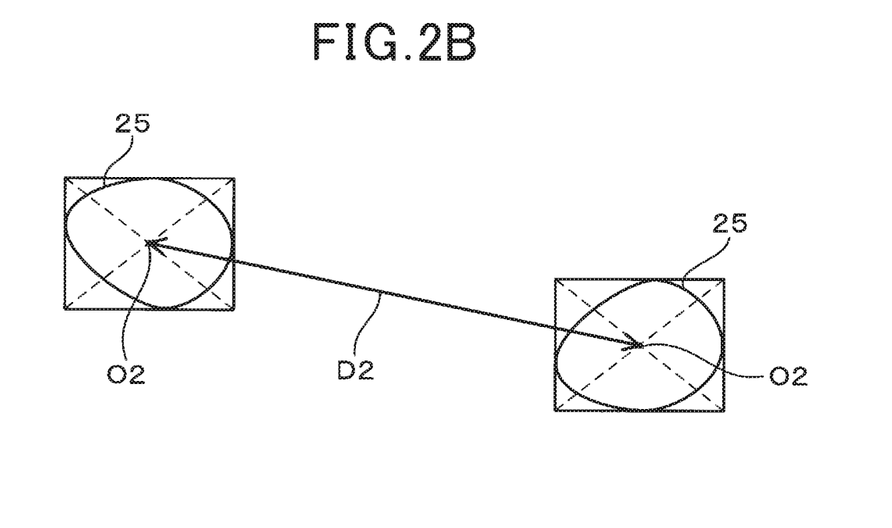
FIG. 2B is an explanatory view showing an distance between voids in the first embodiment.

In the partially stabilized zirconia 2, the average particle size R of the high-concentration phase particles 32 is preferably from 1 to 5 µm. Moreover, the average value $D2_{ave}$ of distances D2 between the voids is preferably 5 µm or less, the standard deviation S of the average value $D2_{ave}$ is preferably 3 or less, and the degree of dispersion A calculated from the average value $D2_{ave}$ and the standard deviation S using the formula (1) is preferably 5.0 or less. When the average particle size R of the high-concentration phase particles 32, the average value $D2_{ave}$ of the distances D2 between the adjacent voids 25, and the degree of dispersion A are respectively within the ranges mentioned above, the high-concentration phase particles 32 that are stable to thermal stress are present in a sufficient size, and the state of dispersion of the voids 25 will be sufficiently homogeneous. As such, the mitigating effect of the voids 25 on volume change of the low-concentration phase particles 31 will be further enhanced. As a result, the deterioration of strength by the development of cracking in the solid electrolyte 1 is further sufficiently suppressed. Further, as illustrated in FIG. 2B, the distance D2 between the voids 25 refers to the distance between the centers of the two.

$$A = S/D2_{ave} \times R \quad (1).$$

The void rate (percentage of the voids) in the solid electrolyte 1 is preferably from 0.5 to 8.0%. In this case, the effect of mitigating the volume change of the low-concentration phase particles 31 by the voids 25 is more sufficiently exhibited, and the strength of the solid electrolyte itself is further improved. From the perspective of further enhancing the strength, the void rate is more preferably from 0.5 to 6.0%.

From the perspective of obtaining the effects of the present disclosure, the type of a stabilizer is not particularly limited, but from the perspective of improving the chemical stability of the stabilizer, the stabilizer is preferably comprised of yttria.

In the solid electrolyte 1, stress is mitigated by the volume expansion of the low-concentration phase particles 31 at a low temperature in the presence of moisture. This effect becomes prominent when the solid electrolyte 1 is used in an application where the solid electrolyte 1 comes into contact with moisture, gas containing moisture and the like.

The solid electrolyte 1 is used in a gas sensor. In the gas sensor, the solid electrolyte 1 can have a contact surface 1A configured to come into contact with a gas such as a measurement gas (see second embodiment to be described later). Examples of the gas include exhaust gas, atmospheric air and the like, and these contain moisture. Therefore, the contact surface 1A can also be a surface in contact with moisture.

Figure 5:
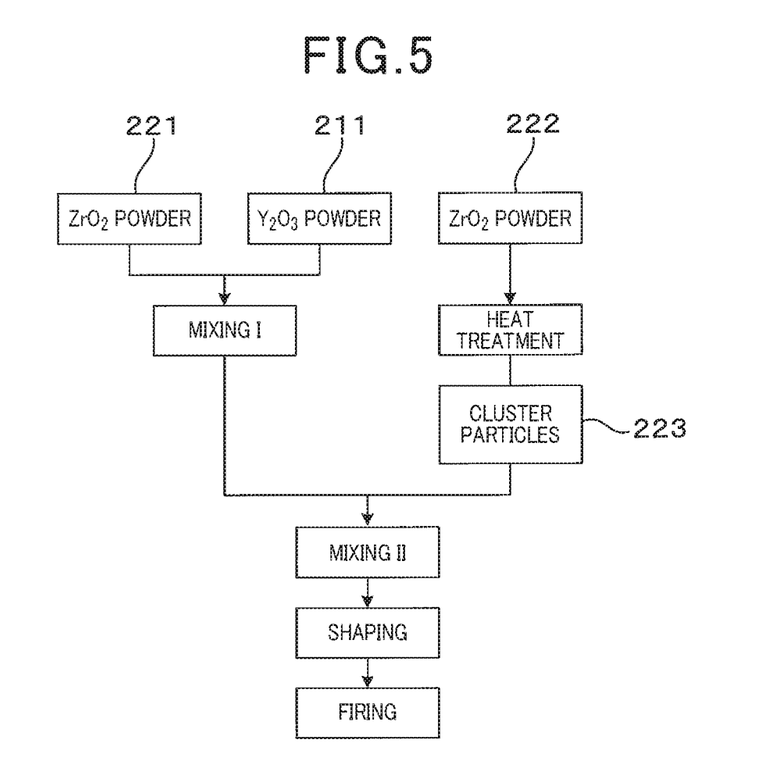
FIG. 5 is an explanatory view showing a production method of the solid electrolyte in the first embodiment.
Figure 6:
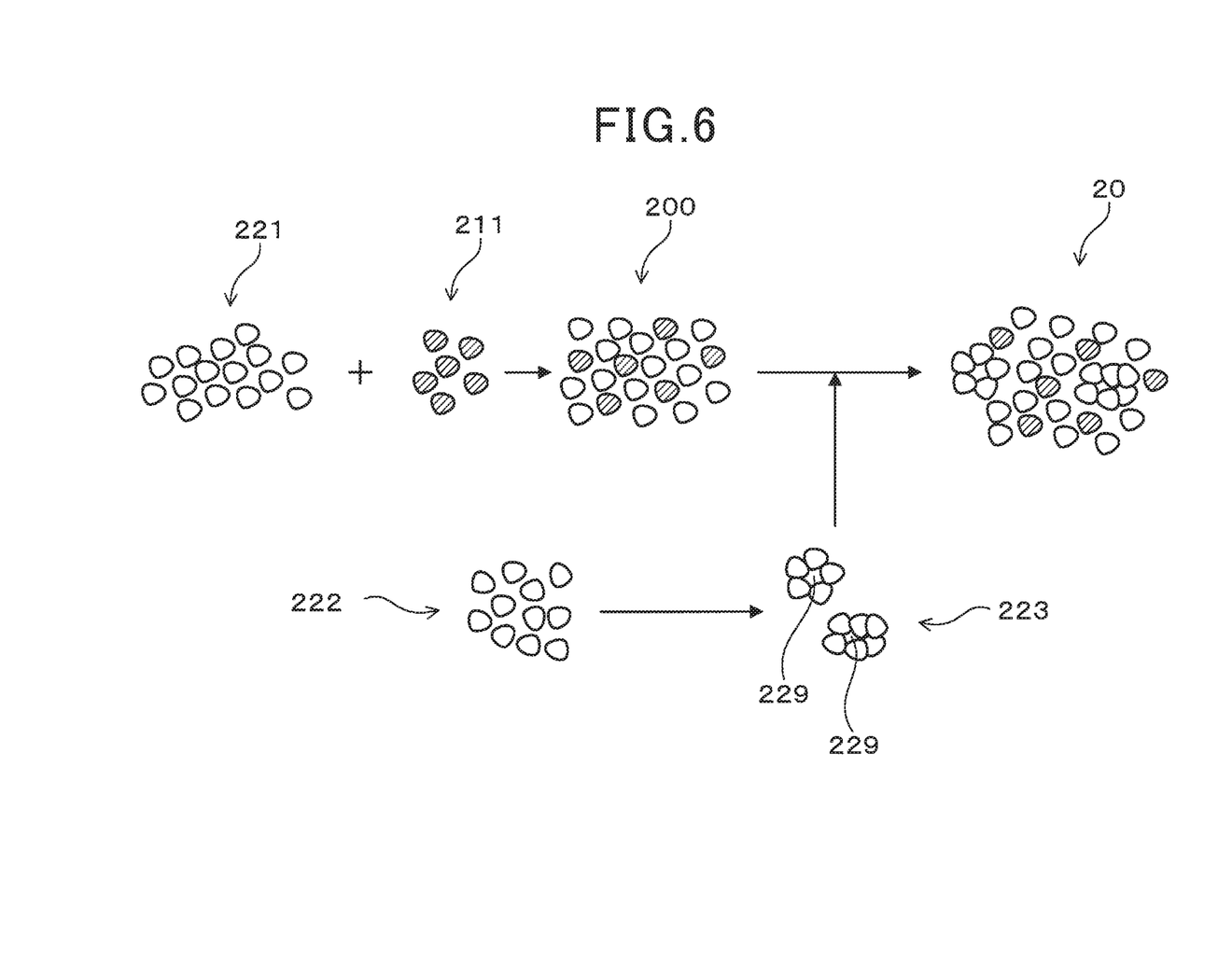
FIG. 6 is an explanatory view schematically showing a heat treatment step and a mixing step in the production method in the first embodiment.

Next, a production method of the solid electrolyte 1 is described. As illustrated in FIG. 5 and FIG. 6, the solid electrolyte 1 is obtained by performing a mixing step, a shaping step and a firing step.

In the mixing step, a first raw material powder 221, a third raw material powder 223, and a stabilizer raw material powder 211 are mixed. Thereby, a mixture 20 is obtained. The third raw material powder 223 is comprised of cluster particles in which a plurality of zirconia particles are aggregated. The third raw material powder 223 is obtained, for example, by heat-treating the second raw material powder 222. Both the first raw material powder 221 and the second raw material powder 222 are comprised of zirconia powder. The stabilizer raw material powder 211 is comprised of a stabilizer such as yttria.

Examples of the stabilizer raw material powder 211 include, yttria powder, calcia powder, magnesia powder, scandia powder, ytterbia powder and the like. At least one of the above can be used as the stabilizer raw material powder 211.

The third raw material powder 223 can be produced by heat-treating zirconia powder. By the heat treatment, the zirconia particles aggregate with one another to form clusters. Thereby, the third raw material powder 223 comprised of cluster particles is obtained. It can be said that the cluster particles are secondary particles formed by aggregation of zirconia particles (that is, primary particles). As illustrated in FIG. 6, each cluster particle constituting the third raw material powder 223 includes voids 229.

Since the cluster particle includes the voids 229 as mentioned above, the voids 25 mentioned above are likely to be formed in the partially stabilized zirconia 2 by using the third raw material powder 223 comprised of cluster particles. As the zirconia powder (that is, the second raw material powder 222) used for heat treatment, it is preferable to use a powder having an average particle size larger than that of the zirconia powder of the first raw material powder 221. In this case, the average particle size of the voids 229 included in the clusters can be increased, and the voids 25 mentioned above are likely to be formed.

The average particle size of each raw material powder can be appropriately adjusted. The average particle size of each raw material powder means the particle size at 50% volume integration in the particle size distribution obtained by a laser diffraction/scattering method. The particle size at a volume integration of 50% in the particle size distribution obtained by the laser diffraction/scattering method is appropriately referred to as a "d50 particle size".

The d50 particle size of the first raw material powder 221 can be, for example, in the range of from 0.2 to 0.5 μm. On the other hand, the d50 particle size of the second raw material powder 222 can be, for example, in the range of from 0.6 to 1.0 μm.

It is preferable that the mixing step further includes a first mixing step and a second mixing step. In FIG. 5, MIXING I means the first mixing step, and MIXING II means the second mixing step. As illustrated in FIG. 6, in the first mixing step, the first raw material powder 221 and the stabilizer raw material powder 211 are mixed. Moreover, by performing a heat treatment step, the second raw material powder 222 is heated to obtain a third raw material powder 223 comprised of cluster particles including the voids 229. In the second mixing step, the mixture 20 is obtained by mixing the third raw material powder 223 with a mixture 200 of the first raw material powder 221 and the stabilizer raw material powder 211.

The mixture 20 can be slurried prior to shaping. To slurry, liquids such as water, alcohol, and liquid organic substances can be used. Preferably, an aqueous liquid is used. The slurried mixture may be granulated.

Next, the shaping step is performed. In the shaping step, the mixture 20 containing the first raw material powder 221, the third raw material powder 223, and the stabilizer raw material powder 211 is molded. Thereby, a predetermined shaped body is obtained. The shaping method is not particularly limited, and examples thereof include powder compacting molding, pressure forming, extrusion molding, injection molding, hot pressing, cold isotropic pressurizing forming, and grinding. By shaping, a predetermined shaped body having a desired shape can be obtained depending on use. For example, predetermined shaped bodies having various shapes such as a plate shape, a sheet shape, a hollow sheet shape, a rod shape, a cylindrical shape, and a bottomed cylindrical shape can be obtained. Grinding can be performed on the predetermined shaped body depending on needs.

Next, in the firing step, the predetermined shaped body is fired. By the firing, the partially stabilized zirconia 2 is generated, and the solid electrolyte 1 is obtained. The firing temperature can be appropriately changed depending on the composition and the like, but it is, for example, from 1,300 to 1,500° C.

In the production method, the third raw material powder 223 in which clusters of zirconia particles are formed in a portion of the zirconia raw material is used. Thereby, the voids 25 mentioned above are likely to be formed in the firing step.

The solid electrolyte 1 of the present embodiment is comprised of the partially stabilized zirconia 2 in which a stabilizer is in a solid solution in the zirconia. The partially stabilized zirconia 2 contains the low-concentration phase particles 31 as the crystal particles 3 constituting the partially stabilized zirconia 2 and has voids 25. When the low-concentration phase particles 31 in which the distance D1 from an adjacent void 25 is 5 μm or less is 65 volume percent or more, the voids 25 can sufficiently mitigate a volume change such as volume expansion of the low-concentration phase particles 31.

Therefore, even if the solid electrolyte 1 is exposed to a low temperature environment of, for example, 100 to 300° C. in the presence of moisture, and volume change associated with phase transition occurs in the low-concentration phase particles 31, the voids 25 present close to the low-concentration phase particles 31 can mitigate the internal stress generated at the grain boundaries of the crystal particles 3. As a result, the solid electrolyte 1 can exhibit excellent strength even when exposed to a low temperature environment in the presence of moisture.

Moreover, the voids 25 can mitigate the volume change of the low-concentration phase particles 31 and reduce the internal stress of the solid electrolyte 1. Therefore, it is considered that the solid electrolyte 1 of the present embodiment can mitigate the internal stress that can be generated not only in a low temperature environment but also in a high temperature environment. It is known that the volume expansion of the low-concentration phase particles 31 occurs, since the transformation from a T phase to a M phase occurs when the temperature falls in a high temperature environment. Since it is considered that the voids 25 can absorb the volume expansion of the low-concentration phase particles 31 when the temperature falls in a high temperature region, the solid electrolyte 1 of the present embodiment is considered to exhibit excellent strength even when exposed to the high temperature region.

Comparative Example 1

Next, a solid electrolyte of a comparative embodiment shall be described. The solid electrolyte is produced in the same method as that of the first embodiment, except that the heat treatment step is not performed and one type of zirconia raw material powder is used instead of the first raw material powder and the third raw material powder.

Specifically, a zirconia raw material powder comprised of zirconia particles and a stabilizer raw material powder are mixed. Next, the mixture is slurried, and then molded and fired. As such, a solid electrolyte 9 of the present embodiment can be obtained.

Figure 7:
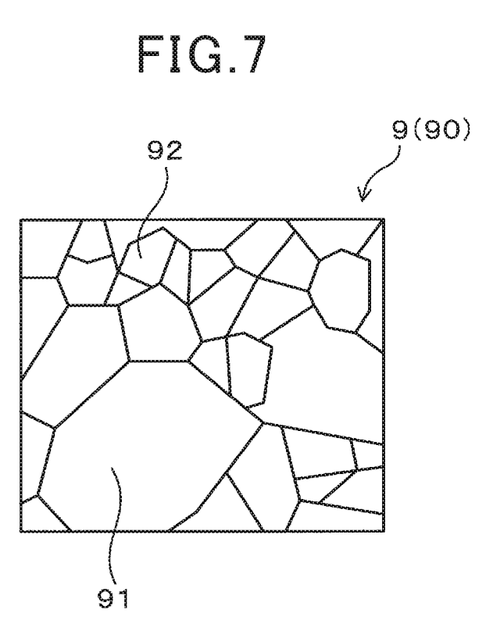
FIG. 7 is a schematic view showing a microstructure of partially stabilized zirconia constituting a solid electrolyte in Comparative the first embodiment.

As illustrated in FIG. 7, the partially stabilized zirconia 90 constituting the solid electrolyte 9 of the present embodiment contains cubic particles 91 (i.e., C phase particles 91), monocline particles 92 (i.e., M phase particles 92) and the like as crystal particles.

In this embodiment, production of bonded particles is not performed in the heat treatment step. Therefore, reactivity between zirconia and the stabilizer is high. As a result, although a drawing of a solid solution state is abbreviated, the stabilizer is in a solid solution not only inside the C phase particles 91 but also inside the M phase particles 92. This can be confirmed by SEM/EDX analysis. The solid electrolyte 9 of the present embodiment does not have mixed phase particles as in the first embodiment. Therefore, the solid electrolyte 9 has insufficient strength against the cooling and heating cycles.

This is because the M phase (or the T-phase) present in the grain boundaries of the C phase undergo phase transformation leading to volume change. Due to the volume change, internal stress is generated in the solid electrolyte 9, and as a result, the strength against the cooling and heating cycles deteriorates. Therefore, when the solid electrolyte 9 is exposed to the cooling and heating cycles reaching a high temperature region, for example, exceeding 1,000° C., the solid electrolyte 9 is likely to develop breakage.

Experimental Example 1

A plurality of solid electrolytes according to embodiments and comparative examples are prepared, and their performances are compared and evaluated. A method for producing the solid electrolyte in the present example shall be hereinafter described.

First, yttria powder, and zirconia powder having a d50 particle size of 0.30 μm were mixed and particle size regulation was performed. Moreover, zirconia powder having a d50 particle size of 0.7 μm was heat treated at 700° C., and thereby zirconia particles were aggregatede with one another. Thereby, coagulated zirconia powder in which clusters of zirconia particles were formed was obtained.

Next, the coagulated zirconia powder was mixed with a mixture of zirconia powder and yttria powder. The zirconia powder having a d50 particle size of 0.30 μm corresponds to the first raw material powder mentioned above, and the coagulated zirconia powder corresponds to the third raw material powder mentioned above. Yttria powder corresponds to the stabilizer raw material powder mentioned above. These mixing ratios can be adjusted according to the target composition.

Next, a mixture of zirconia powder, yttria powder and agglomerated zirconia powder was mixed with water to obtain a slurry of the mixture. In order to increase the fluidity of the raw material particles constituting the mixture and to facilitate shaping into a desired shape, the slurry of the mixture was granulated. Granulation was performed, for example, by spray granulation.

Next, the mixture was molded to obtain a predetermined shaped body. Shaping was performed, for example, by powder compacting molding. In the present example, the mixture was molded into a sample shape to be used in each evaluation to be described later.

Next, the predetermined shaped body was fired at a temperature of 1,400° C. As such, the solid electrolyte was obtained. In the present example, solid electrolytes of Samples 1 to 8 shown in Table 1 were prepared by changing the average particle size of each raw material, the blending ratio, heat treatment conditions when forming clusters (specifically, temperature and time) and the like.

(Observation of Low-Concentration Phase Particles, High-Concentration Phase Particles and Voids)

A measurement sample having a width of 5 mm, a length of 20 mm, and a thickness of 2 mm was cut out from each sample. After polishing the surface of this measurement sample, a thermal etching process was performed thereon. The thermal etching was performed by heating the measurement sample at a temperature of 1,200° C. for 1 hour. By composition analysis by SEM/EDX analysis, Y element mapping was performed on five regions in the measurement sample and observations were made. Among the crystal particles observed, particles having a Y concentration of 4.7 mol % or more were determined as high-concentration phase particles, and particles having a Y concentration of less than 4.7 mol % were determined as low-concentration phase particles. Moreover, voids at the grain boundaries of the crystal particles can be easily determined as blacker portions than the surroundings. The observation conditions of SEM are as follows. Device: "SU8220" manufactured by Hitachi High-Technologies Corporation; Accelerating voltage: 5 kV; WD setting: 8 to 10 mm; Electric current: 10 mA; and Magnification: 5,000 times. Moreover, measuring conditions by EDX were as follows. Device: "Xflash 6160" manufactured by Bruker Corporation; Accelerating voltage: 5 kV; WD setting: 14 mm; Electric current: 5-15 mA; and Magnification: 50,000 times. The electric current was adjusted so that the detection amount was from 40 to 55 kcps.

(Presence Rate of Neighboring Low-Concentration Phase Particles (%))

Regarding a mapping image of Y elements in a predetermined region (specifically, a region surrounded by 20 μm×20 μm) obtained by the SEM/EDX analysis, particle size of low-concentration phase particles included in the image was measured. As mentioned above, the particle size is represented by an arithmetic mean of the lengths of two sides being in a vertical relationship in a rectangle surrounding the particles. The volume of the low-concentration phase particles in the predetermined region mentioned above was calculated by taking the cube of the particle size of each crystal particle. Further, the total volume V1 of all the low-concentration phase particles in the predetermined region was calculated.

On the other hand, regarding the mapping image of Y elements in the same region, the particle size of the neighboring low-concentration phase particles in the image was measured. As mentioned above, the particle size of the neighboring low-concentration phase particles is represented by an arithmetic mean of the lengths of two sides being in a vertical relationship in a rectangle surrounding the particles. By taking the cube of the particle size of each particle, the volume of the neighboring low-concentration phase particles in the predetermined region mentioned above was calculated. Further, the total volume V2 of all the neighboring low-concentration phase particles in the predetermined region was calculated.

Meanwhile, the neighboring low-concentration phase particles can be determined by drawing a circle having a radius of 5 μm from the center of each void in the image and deciding whether or not the center of the low-concentration phase particles is included in the circle. When the center of a low-concentration phase particle is included inside the circle, the low-concentration phase particle is a neighboring low-concentration phase particle. The inside of the circle includes points on the circle. That is, even when the center of a low-concentration phase particle is located on the circle, the low-concentration phase particle is determined to be a neighboring low-concentration phase particle. On the other hand, when the center of a low-concentration phase particles is not included in the circle mentioned above, the low-concentration phase particle is not a neighboring low-concentration phase particle. That is, it is a remote low-concentration phase particle. Meanwhile, in the above description, a circle is mentioned for the sake of explanation based on a two-dimensional image, but the circle substantially means a "sphere".

The presence rate of the neighboring low-concentration phase particles is expressed by an arithmetic mean value of values obtained by finding the values of V3 calculated by the following formula (2) for the five regions mentioned above. The results are shown in Table 1.

$$V3 = 100 \times V2/V1 \quad (2)$$

(Average Particle Size of Low-Concentration Phase Particles, and Average Size of Voids)

The average particle size of the low-concentration phase particles, and the average size of the voids were measured and calculated by the method mentioned above. The results are shown in Table 1.

(Hydrothermal Deterioration Test)

A measurement sample having a width of 5 mm, a length of 20 mm, and a thickness of 2 mm was cut out from each sample. Next, each sample was placed in an autoclave along with water and was heated at a temperature of 230° C. for 10 hours. Then, each measurement sample was taken out from the autoclave.

(Measurement of Strength)

A strength evaluation sample was prepared from the measurement sample according to a four-point bending strength test described in JIS R1601: 2008. Next, a four-point bending strength test was performed in accordance with JIS R1601: 2008. Meanwhile, the test was performed 10 times for each sample. The strength is expressed as an average value of 10 measured values. Table 1 shows the strength after the hydrothermal deterioration test.

TABLE 1

| Sample | presence rate of neighboring low-concentration phase particles (%) | Average particle size of low-concentration phase particles (%) | Average size of voids (μm) | Strength after hydrothermal deterioration test (MPa) | Decision |
| --- | --- | --- | --- | --- | --- |
| 1 | 58 | 0.32 | 0.2 | 64 | P |
| 2 | 65 | 0.35 | 0.23 | 121 | G |
| 3 | 67 | 0.31 | 0.3 | 136 | G |
| 4 | 73 | 0.33 | 0.24 | 128 | G |
| 5 | 75 | 0.34 | 0.4 | 139 | G |
| 6 | 80 | 0.32 | 0.31 | 161 | E |
| 7 | 87 | 0.33 | 0.27 | 165 | E |
| 8 | 97 | 0.32 | 0.38 | 162 | E |

As can be seen from Table 1, Samples 2 to 8 in which the presence rate of the neighboring low-concentration phase particles is 65 volume percent more show sufficiently improved strength after the hydrothermal deterioration test as compared with that of Sample 1. On the other hand, Sample 1 in which the presence rate is less than 65 volume percent show insufficient strength after the hydrothermal deterioration test. Further, it was confirmed that each sample had an initial strength before the hydrothermal deterioration test in the order of 350 MPa. In Sample 1, cracking developed by the stress at the time of phase transformation, and therefore it is considered that the strength reduced as mentioned above.

From Table 1, it can be understood that Samples 2 to 8 show excellent strength even when heated in the presence of moisture. The solid electrolytes of these samples are suitable for a gas sensor. The strength after the hydrothermal deterioration test is preferably 120 MPa or more, more preferably 140 MPa or more, and further preferably 160 MPa or more. In Table 1, the case in which the strength was less than 120 MPa was evaluated as "P (Poor)", the case in which the strength was 120 MPa or more and less than 140 MPa was evaluated as "G (Good)", and the case in which the strength was 140 MPa or more was evaluated as "E (Excellent)". The same applies to Tables 2 to 4 to be described later.

Experimental Example 2

Similarly to Experimental Example 1, a plurality of solid electrolytes were prepared and their performances were compared and evaluated. First, similarly to Experimental Example 1, solid electrolytes of Samples 9 to 35 shown in Table 2 were prepared by changing the average particle size of each raw material, the blending ratio, the heat treatment conditions and the like. For each sample, the same measurements as those in Experimental Example 1 were made, and further, the following initial strength was measured. The results are shown in Table 2. The initial strength is the strength of a solid electrolyte before the hydrothermal deterioration test.

TABLE 2

| Sample | presence rate of neighboring low-concentration phase particles (%) | Average particle size of low-concentration phase particles (%) | Average size of voids (μm) | Initial strength (MPa) | Strength after hydrothermal deterioration test (MPa) | Decision |
|---|---|---|---|---|---|---|
| 9 | 68 | 0.03 | 0.03 | 356 | 101 | P |
| 10 | 67 | 0.05 | 0.07 | 361 | 123 | G |
| 11 | 68 | 0.07 | 4.6 | 261 | 138 | G |
| 12 | 67 | 0.31 | 0.3 | 367 | 136 | G |
| 13 | 67 | 0.9 | 0.07 | 359 | 122 | G |
| 14 | 68 | 0.9 | 4.8 | 250 | 133 | G |
| 15 | 69 | 1.2 | 0.03 | 349 | 102 | P |
| 16 | 66 | 1.3 | 5.1 | 167 | 99 | P |
| 17 | 83 | 0.06 | 0.07 | 355 | 151 | E |
| 18 | 82 | 0.07 | 0.8 | 361 | 154 | E |
| 19 | 80 | 0.32 | 0.31 | 357 | 161 | E |
| 20 | 84 | 0.08 | 1.8 | 356 | 152 | E |
| 21 | 82 | 0.92 | 1.7 | 361 | 160 | E |
| 22 | 83 | 0.07 | 4.7 | 228 | 135 | G |
| 23 | 84 | 0.89 | 4.6 | 231 | 129 | G |
| 24 | 82 | 1.22 | 0.03 | 351 | 93 | P |
| 25 | 83 | 1.16 | 5.3 | 191 | 82 | P |
| 26 | 95 | 0.07 | 0.06 | 349 | 151 | E |
| 27 | 97 | 0.32 | 0.38 | 357 | 162 | E |
| 28 | 98 | 0.33 | 0.91 | 343 | 168 | E |
| 29 | 96 | 0.9 | 0.07 | 347 | 143 | E |
| 30 | 97 | 0.06 | 4.6 | 244 | 138 | G |
| 31 | 94 | 0.9 | 4.8 | 248 | 133 | G |
| 32 | 96 | 1.2 | 0.03 | 352 | 102 | P |
| 33 | 97 | 1.3 | 5.1 | 169 | 99 | P |
| 34 | 63 | 0.35 | 0.23 | 363 | 93 | P |
| 35 | 63 | 0.03 | 0.02 | 351 | 84 | P |

In Table 2, the strength of each of Samples 10 to 15 after the hydrothermal deterioration test is more improved than those of Sample 9 and Sample 16 as can be seen by comparing Samples 9 to 16 with one another in which the presence rates of the neighboring low-concentration phase particles are close to one another. As a result, it can be understood that the average particle size of the low-concentration phase particles is preferably 0.05 to 1.0 μm, and the average size of the voids is preferably 0.05 to 5.0 μm. The same can be understood by comparing Samples 17 to 25 with one another, and Samples 26 to 33 with one another. Moreover, it can be understood that the strength of the solid electrolyte itself tends to deteriorate when the void size becomes large as in Samples 16, 25, and 33.

Experimental Example 3

Similarly to Experimental Example 1, a plurality of solid electrolytes are prepared and their performances are compared and evaluated. First, similarly to Experimental Example 1, solid electrolytes of Samples 36 to 47 shown in Table 3 were prepared by changing the average particle size of each raw material, the blending ratio, the heat treatment conditions and the like. For each sample, the presence rate of the neighboring low-concentration phase particles and the strength after the hydrothermal deterioration test were measured in the same manner as that in Experimental Example 1, and the following measurements were further made.

(Average Particle Size R of High-Concentration Phase Particles)

The average particle size R of the high-concentration phase particles was measured and calculated by the method mentioned above. The results are shown in Table 3.

(Average Value $D2_{ave}$ of Distances Between Spaces, Standard Deviation S, and Degree of Dispersion)

distances between spaces are measured at 50 positions, the average value $D2_{ave}$ is calculated from the arithmetic mean of measured values, and the standard deviation S is also calculated. Next, based on the average particle size R of the high-concentration phase particles, the average value $D2_{ave}$ of distances between voids, and the standard deviation S, the degree of dispersion A was calculated from formula (1) mentioned above. The results are shown in Table 3.

TABLE 3

| Sample | presence rate of neighboring low-concentration phase particles (%) | Degree of dispersion | Average particle size of the high-concentration phase particles (μm) | Average value $D2_{ave}$ of distances between voids (μm) | Standard deviation S of average value $D2_{ave}$ (μm) | Strength after hydrothermal deterioration test (MPa) | Decision |
|---|---|---|---|---|---|---|---|
| 36 | 83 | 0.4 | 0.4 | 0.2 | 0.2 | 161 | E |
| 37 | 82 | 0.7 | 1.7 | 0.5 | 0.2 | 158 | E |
| 38 | 82 | 1.8 | 3.6 | 1.8 | 0.9 | 162 | E |
| 39 | 82 | 1.7 | 2.78 | 3.15 | 1.87 | 158 | E |
| 40 | 86 | 2 | 2.95 | 3.31 | 2.21 | 153 | E |
| 41 | 83 | 2.3 | 3.4 | 3.3 | 2.2 | 143 | E |
| 42 | 82 | 3.1 | 4.6 | 3.3 | 2.2 | 134 | G |

TABLE 3-continued

| Sample | presence rate of neighboring low-concentration phase particles (%) | Degree of dispersion | Average particle size of the high-concentration phase particles (μm) | Average value D2$_{ave}$ of distances between voids (μm) | Standard deviation S of average value D2$_{ave}$ (μm) | Strength after hydrothermal deterioration test (MPa) | Decision |
|---|---|---|---|---|---|---|---|
| 43 | 94 | 4.9 | 5.9 | 2.3 | 1.9 | 123 | G |
| 44 | 91 | 5.2 | 8.8 | 5.2 | 3.1 | 109 | P |
| 45 | 94 | 5.6 | 9.1 | 4.7 | 2.9 | 101 | P |
| 46 | 86 | 6.1 | 10.1 | 5.5 | 3.3 | 97 | P |
| 47 | 88 | 7.6 | 10.2 | 4.3 | 3.2 | 96 | P |

As can be seen from Table 3, when the degree of dispersion increases and the dispersibility of the voids deteriorates, the strength after the hydrothermal deterioration test is adversely affected. Therefore, the degree of dispersion is preferably 5.0 or less from the perspective of further enhancing strength after heating in the presence of moisture. From the same perspective, the average particle size R of the high-concentration phase particles is preferably 1 to 5 μm, the average value D2$_{ave}$ of the distances between the voids is 5 μm or less, and the standard deviation S thereof is preferably 3 or less.

Experimental Example 4

Similarly to Experimental Example 1, a plurality of solid electrolytes are prepared and their performances are compared and evaluated. First, similarly to Experimental Example 1, solid electrolytes of Samples 48 to 57 shown in Table 2 were prepared by changing the average particle size, the blending ratio, the heat treatment conditions and the like of each raw material. For each sample, the same measurements as those of Experimental example 1 were made, the initial strength of Experimental example 2 was measured, and further, the void rate was measured by the following method. The results are shown in Table 4.
(Void Rate)
A bulk density D1 and a true density D2 were measured, and the void rate Z was calculated from the following formula (3). The results are shown in Table 4.

$Z=(1-D1/D2)\times100$

The bulk density was calculated according to JIS R1634: 1998.
For the true density, a measurement sample of a solid electrolyte body was pulverized into a powder with an automatic mortar, and a value obtained by measuring the density with a density measuring device was adopted. As for the density measuring device, an "AccuPyc II 1340" manufactured by Micromeritics was used.

TABLE 4

| Sample | presence rate of neighboring low-concentration phase particles (%) | Average particle size of low-concentration phase particles (%) | Average size of voids (μm) | void rate (%) | Initial strength (MPa) | Strength after hydrothermal deterioration test (MPa) | Decision |
|---|---|---|---|---|---|---|---|
| 48 | 82 | 0.27 | 0.29 | 0.5 | 361 | 124 | G |
| 49 | 81 | 0.32 | 0.31 | 0.9 | 331 | 153 | E |
| 50 | 83 | 0.29 | 0.21 | 1.8 | 349 | 166 | E |
| 51 | 82 | 0.26 | 0.32 | 2.9 | 327 | 162 | E |
| 52 | 82 | 0.28 | 0.26 | 4.5 | 359 | 158 | E |
| 53 | 86 | 0.31 | 0.23 | 6.1 | 331 | 153 | E |
| 54 | 83 | 0.33 | 0.27 | 7.8 | 316 | 124 | G |
| 55 | 82 | 0.27 | 0.31 | 8.3 | 201 | 109 | P |
| 56 | 94 | 0.31 | 0.26 | 10 | 187 | 94 | P |
| 57 | 94 | 0.31 | 0.26 | 10 | 187 | 94 | P |

As can be seen from Table 4, by setting the void rate to fall within a predetermined range, the initial strength and the strength after the hydrothermal deterioration test further improve. From the perspective of improving them at high levels, the void rate is preferably from 0.5 to 8%.

Second Embodiment

Next, an embodiment of a gas sensor 5 using a solid electrolyte shall be described. Meanwhile, of the reference signs used in the second embodiment onward, the same reference signs as those used in the already mentioned embodiments represent the same components and the like as those in the already mentioned embodiments unless otherwise indicated.

Figure 8:
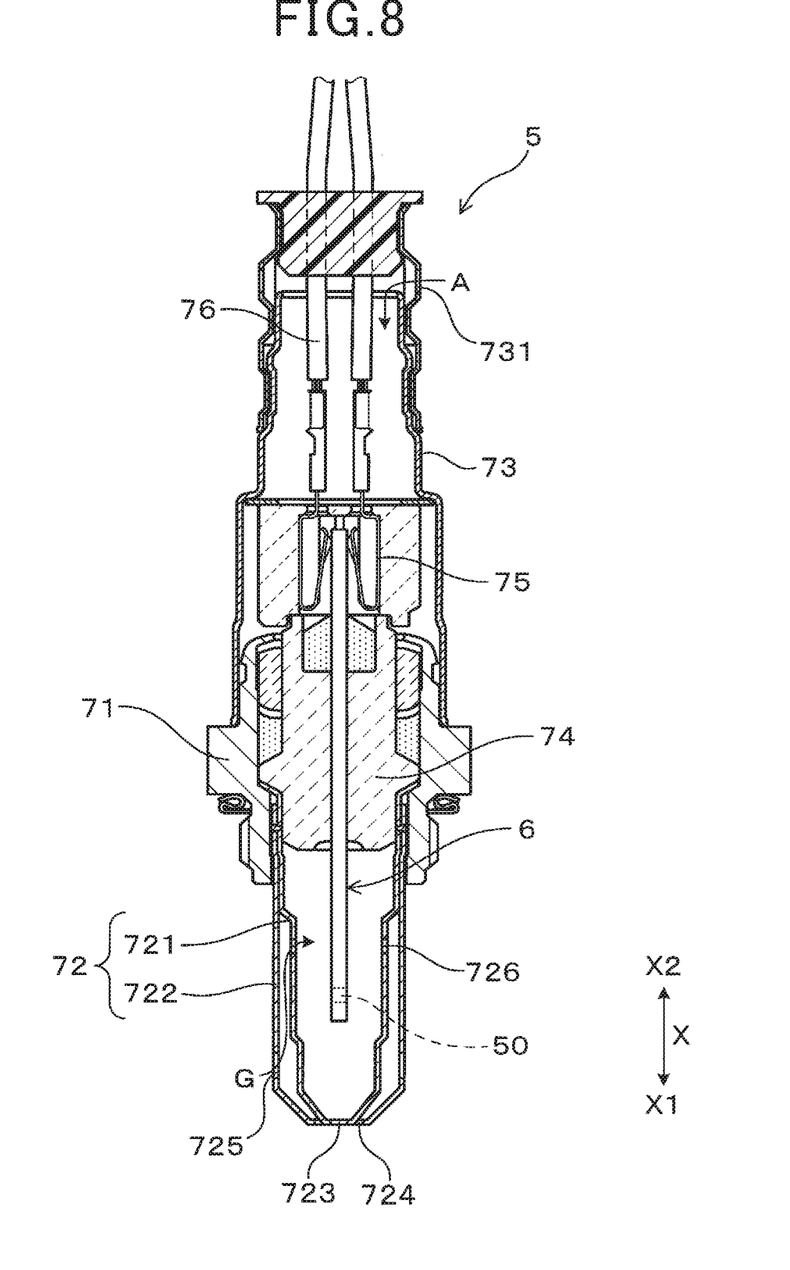
FIG. 8 is a cross-sectional view of a gas sensor in a second embodiment.
Figure 9:
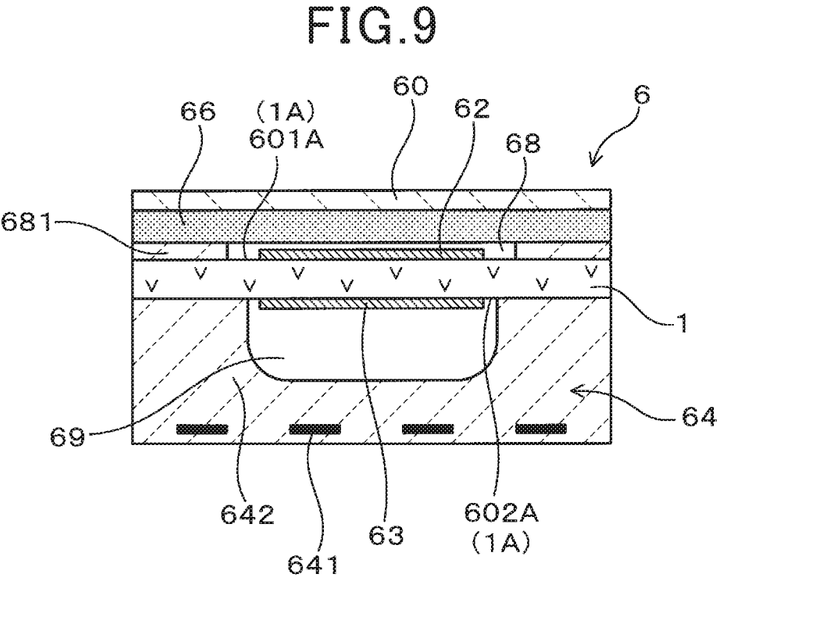
FIG. 9 is a cross-sectional view of a laminated type gas sensor element in the second embodiment.

The gas sensor 5 of the present embodiment is provided with a sensor element 6 as shown in FIG. 8 and FIG. 9. The sensor element 6 of the present embodiment is a gas sensor element that detects gas. The sensor element 6 has the solid electrolyte 1, a detection electrode 62, a reference electrode 63, and a diffusion resistance layer 66. That is, the gas sensor 5 includes the solid electrolyte 1 inside the sensor element 6. The detection electrode 62 and the reference electrode 63 are formed on respective surfaces 601A and 602A of the solid electrolyte 1. The detection electrode 62 and the reference electrode 63 form a pair of electrodes formed at positions facing each other. The diffusion resistance layer 66 limits the flow rate of measurement gas such as an exhaust gas G that reaches the detection electrode 62. The gas sensor 5 is of a limiting current type that detects the oxygen concentration (that is, the air-fuel ratio) of the exhaust gas G based on the magnitude of a limiting current generated between the electrodes 62 and 63 in a state where a voltage is applied between the pair of electrodes 62 and 63.

The gas sensor 5 of the present embodiment shall hereinafter be described in detail. Meanwhile, in the following description, the side of the gas sensor 5 exposed to a measurement gas such as the exhaust gas Gin the axial direction X is referred to as a tip side X1, and the opposite side of the gas sensor 5 is referred to as a base end side X2.

(Gas Sensor)

The gas sensor 5 is arranged to an exhaust pipe of an internal combustion engine of a vehicle and the like, and it is used. The gas sensor 5 of a limiting current type of the present embodiment is used as an air-fuel ratio sensor that quantitatively detects the air-fuel ratio of the exhaust gas G flowing through the exhaust pipe. The gas sensor 5 can quantitatively obtain the air-fuel ratio in both cases where the air-fuel ratio of the exhaust gas G is on the rich side and on the lean side.

Here, the air-fuel ratio of the exhaust gas G refers to a mixing ratio of fuel to air when burned in the internal combustion engine. Moreover, the rich side means that the air-fuel ratio of the exhaust gas G is on the side where there is more fuel than the theoretical air-fuel ratio when the fuel and air are completely combusted. The lean side means that the air-fuel ratio of the exhaust gas G is on the side where there is less fuel than the theoretical air-fuel ratio.

In the gas sensor 5 of the present embodiment, the air-fuel ratio of the exhaust gas is detected by detecting the oxygen concentration of the exhaust gas. The gas sensor 5 as an air-fuel ratio sensor substantially detects the oxygen concentration of the exhaust gas G on the lean side, and detects the unburned gas concentration of the exhaust gas G on the rich side.

As shown in FIG. 8, the gas sensor 5 includes a housing 71, a tip side cover 72, a base end side cover 73 and the like in addition to the sensor element 6. The housing 71 is attached to the exhaust pipe and holds the sensor element 6 via an insulator 74. The tip side cover 72 is attached to the tip side X1 of the housing 71 and covers the sensor element 6. The tip side cover 72 has a double structure, and it is comprised of an inner cover 721 and an outer cover 722. The base end side cover 73 is attached to the base end side X2 of the housing 71, and it covers a terminal 75 for electric wiring of the sensor element 6 and the like.

(Sensor Element)

As illustrated in FIG. 9, a laminated type sensor element, for example, is used as the sensor element 6. That is, the sensor element 6 can be configured by a laminate in which the reference electrode 63, the plate-shaped solid electrolyte 1, and the detection electrode 62 are sequentially laminated.

As illustrated in FIG. 9, the sensor element 6 has, for example, a plate-shaped solid electrolyte 1. The solid electrolyte 1 has a measurement gas surface 601A and a reference gas surface 602A. The measurement gas surface 601A is a surface exposed to a measurement gas such as the exhaust gas G. On the other hand, the reference gas surface 602A is a surface exposed to a reference gas such as the atmosphere A. The measurement gas surface 601A and the reference gas surface 602A are surfaces opposite to each other in the solid electrolyte 1.

The detection electrode 62 is provided on the measurement gas surface 601A of the solid electrolyte 1. On the other hand, the reference electrode 63 is provided on the reference gas surface 602A. When the sensor element 6 is comprised of such a laminated type sensor element, a heating element 641 constituting a heater 64 is laminated on the solid electrolyte 1 via an insulator 642. The insulator 642 is made of, for example, alumina.

The detection electrode 62 faces a measurement gas chamber 68. Measurement gas is introduced into the measurement gas chamber 68 via the porous diffusion resistance layer 66. The measurement gas chamber 68 is a space surrounded by the solid electrolyte 1, a measurement gas chamber forming layer 681, and the diffusion resistance layer 66. The detection electrode 62 is formed in contact with the solid electrolyte 1, and the measurement gas chamber forming layer 681 that is a structural member of the measurement gas chamber 68 is formed in contact with the solid electrolyte 1. The detection electrode 62 is exposed to a measurement gas such as the exhaust gas G, and is a part that performs gas detection together with the reference electrode 63. The detection electrode 62 is electrically connected to the terminal 75 to which a lead wire 76 is connected.

The reference electrode 63 faces a reference gas chamber 69. A reference gas such as the atmospheric air A is introduced from the base end side X2 into the reference gas chamber 69 via a passage hole 731 of the base end side cover 73. Meanwhile, a cup-type sensor element to be described later can be used instead of the laminated type sensor element as the sensor element 6.

The detection electrode 62 is exposed to a measurement gas such as the exhaust gas G that flows into the tip side cover 42 through passage holes 723, 724, and 725 provided in the tip side cover 72. The reference electrode 63 is exposed to a reference gas such as atmospheric air A that flows from the inside of the base end side cover 73 into the reference gas chamber 69 of the solid electrolyte 1 through the passage hole 731 provided in the base end side cover 73.

The heater 64 generates heat by energizing, and heats the solid electrolyte 1 and the electrodes 62 and 63 to an activation temperature at the start of the internal combustion engine and the gas sensor 5 and the like. The heater 64 is comprised of the insulator 642 made of an alumina sintered body and the heating element 641 formed therein. The alumina sintered body constituting the insulator 642 is in contact with the solid electrolyte. The insulator 642 constituting the heater 64 is also a structural member forming the reference gas chamber 69, and also plays a role as the reference gas chamber forming layer.

Moreover, in the solid electrolyte 1, the measurement gas chamber forming layer 681 constituting the measurement gas chamber 68 is laminated on the side of the measurement gas surface 601A. The measurement gas chamber forming layer 681 is made of alumina. That is, the solid electrolyte 1 is in contact with the insulator 642 constituting the heater 64 mentioned above on the side of the reference gas surface 602A, and is in contact with the measurement gas chamber forming layer 681 on the side of the measurement gas surface 601A side.

The diffusion resistance layer 66 is comprised of, for example, a spinel porous body. Moreover, a shielding layer 60 made of alumina is provided on the surface of the diffusion resistance layer 66. The shielding layer 60 is made of a dense body that does not transmit gas. The exhaust gas G that flowed into the tip side cover 72 passes through the diffusion resistance layer 66 and reaches a measurement unit 50 of the detection electrode 62. In the constitution of the sensor element 6 illustrated in FIG. 9, the diffusion resistance layer 66 is not in contact with the solid electrolyte 1, but it is possible to adopt a constitution in which the diffusion resistance layer 66 is in contact with the solid electrolyte 1.

(Solid Electrolyte)

The solid electrolyte 1 is comprised of the partially stabilized zirconia 2. Specifically, the solid electrolyte described in the first embodiment is used. The solid electrolyte 1 excels in strength against the cooling and heating cycles, and retains high strength against cooling and heating cycles exposed to a high temperature region, for example, temperatures exceeding 1,000° C. Therefore, even if the gas sensor 5 is applied for use, for example, above 1,000° C., the gas sensor 5 can detect a measurement gas while retaining high reliability.

(Electrodes)

The material of the detection electrode 62 of the present embodiment is not particularly limited as long as it has a catalytic activity for oxygen and the like. For example, the detection electrode 62 may contain, as a noble metal component, any composition of Au (gold), Ag (silver), a mixture or an alloy of Pd (palladium) and Ag, and a mixture or an alloy of Pt and Au. Moreover, the material of the reference electrode 63 is not particularly limited, but may contain, as noble metal components, Pt (platinum), Au, Ag, Pd, a mixture or an alloy of Pd and Ag, a mixture or an alloy of Pt and Au and the like.

Figure 10:
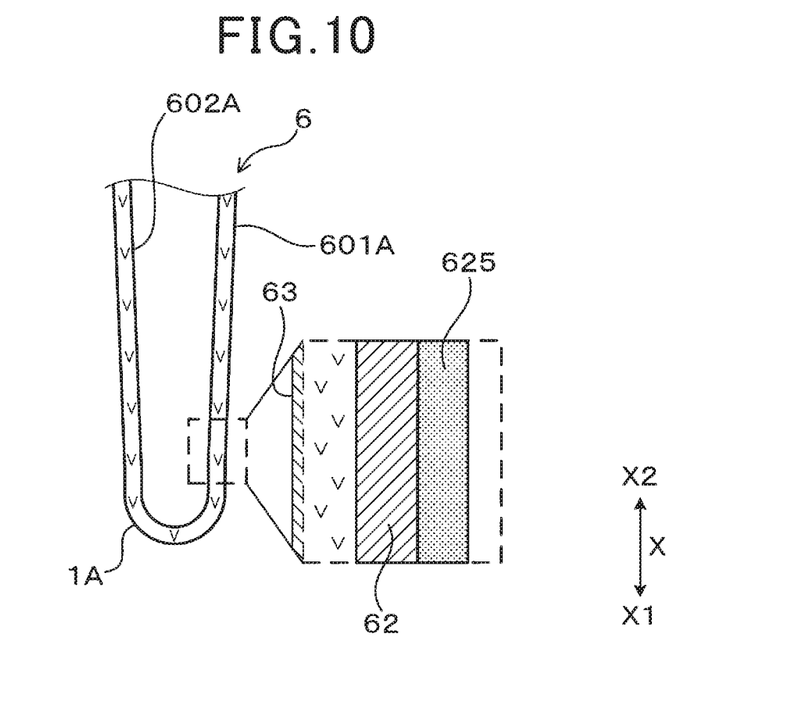
FIG. 10 is an explanatory view of a cross section of a cup-type gas sensor element in the second embodiment.

Moreover, as illustrated in FIG. 10, a bottomed cylindrical type (specifically, a cup-type) sensor element, for example, can be used as the sensor element 6, instead of the laminated type sensor element. Such a cup-type sensor element has the solid electrolyte 1 having a bottomed cylindrical shape (specifically, a cup shape), the detection electrode 62, and the reference electrode 63. The detection electrode 62 is provided on the outer peripheral surface 601A of the solid electrolyte 1. The reference electrode 63 is provided on the inner peripheral surface 602A of the solid electrolyte 1. In such a cup-type sensor element, a rod heater (not shown in the drawings) is inserted into the inside of the sensor element 6. The heater heats the sensor element 6 to a desired temperature.

The detection electrode 62 is provided on the outer peripheral surface 601A of the solid electrolyte 1. Further, a porous protective layer 625 is formed on the outer peripheral surface 601A of the solid electrolyte. In FIG. 10, the protective layer 625 is a porous body, and is comprised of, for example, spinel. Meanwhile, in the illustration of FIG. 10, the detection electrode 62 is present between the protective layer 625 and the solid electrolyte 1, but the detection electrode 62 is not necessarily formed on the entire outer peripheral surface 601A, and a non-formation part is usually present. Therefore, although not shown in the drawings of the configuration, a portion in which the protective layer 625 contacts the solid electrolyte 1 is present.

Moreover, a reference electrode 63 is provided on the inner peripheral surface of the cup-type solid electrolyte 1, but the reference electrode 63 may be provided on the entire inner peripheral surface or on a portion thereof. When provided on a portion thereof, alumina including a heater may contact the solid electrolyte.

Similarly to the case of the laminated type sensor element, strength against the cooling and heating cycles improves also in the cup-type sensor element by using the solid electrolyte 1 in the first embodiment. Therefore, even in the gas sensor 5 including the cup-type sensor element, the gas sensor 5 can detect the measurement gas while maintaining high reliability.

The present disclosure is not limited to each of the embodiments mentioned above, and it can be applied to various embodiments in a scope not departing from the substance thereof. That is, although the present disclosure has been described based on the embodiments, the present disclosure should be understood not to be limited to the embodiments, structure, and the like. The present disclosure includes various modified examples and modifications within the equivalent scope. In addition, various combinations and configurations, as well as other combinations and configurations including only one element, or more than or less than one element, are within the scope and spirit of the present disclosure. For example, the solid electrolyte in the first embodiment can be applied to an oxygen sensor, a NOx sensor and the like in addition to the air-fuel ratio sensor illustrated in the second embodiment.

What is claimed is:

1. A solid electrolyte for a gas sensor, the solid electrolyte comprising a partially stabilized zirconia that is comprised of zirconia and a stabilizer being in a solid solution in the zirconia;

wherein:
the partially stabilized zirconia comprises crystal particles,
the crystal particles include stabilizer low-concentration crystalline phase particles each being defined such that the concentration of the stabilizer of each of the stabilizer low-concentration crystalline phase particles is less than 4.7 mol %,
the partially stabilized zirconia comprises voids between the crystal particles, and
the stabilizer low-concentration crystalline phase particles in the partially stabilized zirconia include specific stabilizer low-concentration crystalline phase particles each having a distance of 5 µm or less from at least one adjacent void adjacent to the specific stabilizer low-concentration crystalline phase particle in the voids, a presence ratio of the specific stabilizer low-concentration crystalline phase particles being 65 volume percent or more, the distance being a distance between a center of the specific stabilizer low-concentration crystalline phase particle and a center of the at least one adjacent void.

2. The solid electrolyte for a gas sensor according to claim 1, wherein
the stabilizer low-concentration crystalline phase particles include:
small-particle size that correspond to the smallest 10% of particle sizes in a number particle size distribution of the stabilizer low-concentration crystalline phase particles; and
large-particle size particles that correspond to the largest 10% of particle sizes in the number particle size distribution of the stabilizer low-concentration crystalline phase particles,
an average particle size of the stabilizer low-concentration crystalline phase particles, exclusive of the small-particle size particles and large-particle size particles, is set to be from 0.05 to 1.0 µm,
the voids include:
smaller size voids that correspond to the smallest 10% of sizes in a number particle size distribution of the voids; and
larger size voids that correspond to the largest 10% of sizes in the number particle size distribution of the voids, and
an average size of the voids, exclusive of the smaller size voids and larger size voids, is set to be from 0.05 to 5.0 µm.

3. The solid electrolyte for a gas sensor according to claim 1, wherein
the crystal particles further include stabilizer high-concentration crystalline phase particles each being defined such that the concentration of the stabilizer of each of the stabilizer high-concentration crystalline phase particles is 4.7 mol % or more,
the stabilizer high-concentration crystalline phase particles include:
small-particle size particles that correspond to the smallest 10% of particle sizes in a number particle size distribution of the stabilizer high-concentration crystalline phase particles; and
large-particle size particles that correspond to the largest 10% of particle sizes in the number particle size distribution of the stabilizer high-concentration crystalline phase particles,
an average particle size of the stabilizer high-concentration crystalline phase particles, exclusive of the small-particle size particles and large-diameter size particles, is set to be from 1 to 5 μm,
an average value of distances between the voids is 5 μm or less,
a standard deviation of the average value of the distances between the voids is 3 μm or less, and
a degree of dispersion calculated from the average value of the distances between the voids and the standard deviation using the following formula (1) is 5.0 or less:

$$A = S/D2_{ave} \times R \quad (1)$$

where:
A represents the degree of dispersion,
S represents the standard deviation,
$D2_{ave}$ represents the average value of the distances between the voids, and
R represents the average particle size of the stabilizer high-concentration crystalline phase particles.

4. The solid electrolyte for a gas sensor according to claim 1, wherein
a mass percentage of the voids in the solid electrolyte is from 0.5 to 8%.

5. The solid electrolyte for a gas sensor according to claim 1, wherein
the stabilizer is comprised of yttria.

6. A gas sensor comprising the solid electrolyte according to claim 1.

* * * * *